(12) United States Patent
Lin et al.

(10) Patent No.: US 11,800,523 B2
(45) Date of Patent: Oct. 24, 2023

(54) USER EQUIPMENT AND METHOD FOR CONFIGURING PUCCH RESOURCES

(71) Applicant: FG Innovation Company Limited, Tuen Mun (HK)

(72) Inventors: Wan-Chen Lin, Taipei (TW); Hai-Han Wang, Taipei (TW); Heng-Li Chin, Taipei (TW)

(73) Assignee: FG Innovation Company Limited, Tuen Mun (HK)

(*) Notice: Subject to any disclaimer, the term of this patent is extended or adjusted under 35 U.S.C. 154(b) by 0 days.

(21) Appl. No.: 17/143,964

(22) Filed: Jan. 7, 2021

(65) Prior Publication Data

US 2021/0212055 A1 Jul. 8, 2021

Related U.S. Application Data

(60) Provisional application No. 62/958,164, filed on Jan. 7, 2020.

(51) Int. Cl.
*H04W 72/21* (2023.01)
*H04W 72/0453* (2023.01)
(Continued)

(52) U.S. Cl.
CPC .......... *H04W 72/21* (2023.01); *H04B 7/0482* (2013.01); *H04L 1/1819* (2013.01);
(Continued)

(58) Field of Classification Search
CPC ......... H04W 72/0413; H04W 72/0453; H04W 72/10; H04W 72/1289; H04W 72/0406;
(Continued)

(56) References Cited

U.S. PATENT DOCUMENTS

2018/0027550 A1 1/2018 Berggren
2019/0222283 A1 7/2019 Yum et al.
(Continued)

FOREIGN PATENT DOCUMENTS

CN 109156026 A 1/2019
CN 110431759 A 11/2019
(Continued)

OTHER PUBLICATIONS

3GPP TS 38.212 V16.0.0 (Dec. 2019); 3GPP Technical Specification Group Radio Access Network; NR; Multiplexing and channel coding (Release 16); 650 Route des Lucioles—Sophia Antipolis; Valbonne—France.
(Continued)

*Primary Examiner* — Sharmin Chowdhury
(74) *Attorney, Agent, or Firm* — ScienBiziP, P.C.

(57) ABSTRACT

A user equipment and a method for configuring Physical Uplink Control Channel (PUCCH) resources are provided. The method includes receiving a first bandwidth part (BWP) configuration associated with a first uplink (UL) BWP, the first BWP configuration including a PUCCH configuration list with a first PUCCH configuration and a second PUCCH configuration, the first PUCCH configuration indicating a first set of PUCCH resource identifiers (IDs), the second PUCCH configuration indicating a second set of PUCCH resource IDs; and receiving a second BWP configuration associated with a second UL BWP, the second BWP configuration including a third PUCCH configuration, the third PUCCH configuration indicating a third set of PUCCH resource IDs. The first set of PUCCH resource IDs and the second set of PUCCH resource IDs share no common PUCCH resource ID.

12 Claims, 5 Drawing Sheets

(51) Int. Cl.
  *H04B 7/0456* (2017.01)
  *H04L 1/1812* (2023.01)
  *H04L 5/00* (2006.01)
  *H04W 72/23* (2023.01)
  *H04W 72/56* (2023.01)

(52) U.S. Cl.
  CPC ....... *H04L 5/0055* (2013.01); *H04W 72/0453* (2013.01); *H04W 72/23* (2023.01); *H04W 72/56* (2023.01)

(58) Field of Classification Search
  CPC ... H04B 7/0482; H04L 1/1819; H04L 5/0055; H04L 1/1854; H04L 1/1822; H04L 5/0053; H04L 5/0094; H04L 5/001
  See application file for complete search history.

(56) References Cited

U.S. PATENT DOCUMENTS

| | | | |
|---|---|---|---|
| 2019/0239216 A1 | 8/2019 | Kundu et al. | |
| 2019/0379506 A1 | 12/2019 | Cheng | |
| 2020/0145169 A1* | 5/2020 | Zhou | H04L 1/1861 |
| 2020/0305168 A1* | 9/2020 | Liou | H04W 72/0493 |
| 2020/0351129 A1* | 11/2020 | Kwak | H04W 72/0493 |
| 2021/0204276 A1* | 7/2021 | Ge | H04W 72/23 |
| 2022/0052824 A1* | 2/2022 | Kim | H04L 1/1896 |
| 2022/0077969 A1* | 3/2022 | Kim | H04L 5/0055 |
| 2022/0078768 A1* | 3/2022 | El Hamss | H04L 1/1812 |

FOREIGN PATENT DOCUMENTS

| | | |
|---|---|---|
| EP | 3648386 A1 | 5/2020 |
| WO | 2018/175577 A1 | 9/2018 |
| WO | 2019/233352 A1 | 12/2019 |

OTHER PUBLICATIONS

3GPP TS 38.331 V15.7.0 (Sep. 2019); 3GPP Technical Specification Group Radio Access Network; NR; RRC protocol specification (Release 15); 650 Route des Lucioles—Sophia Antipolis; Valbonne—France.
Huawei, HiSilicon, "Mapping between PUCCH resource ID and PUCCH-Config for eURLLC", 3GPP TSG RAN WG2 #109bis-e R2-2003615, Apr. 10, 2020.
Asia Pacific Telecom, "UCI enhancements", 3GPP TSG RAN WG1 #100_e R1-2000775, Feb. 14, 2020.
Nokia, Nokia Shanghai Bell, "Maintenance of Rel-16 URLLC UCI enhancements", 3GPP TSG RAN WG1 #100_e R1-2000405, Feb. 14, 2020.
Qualcomm Incorporated, "Considerations for URLLC resource allocation for PUCCH", 3GPP TSG RAN WG1 #93 R1-1807362, May 12, 2018.

* cited by examiner

USER EQUIPMENT AND METHOD FOR CONFIGURING PUCCH RESOURCES

CROSS-REFERENCE TO RELATED APPLICATION(S)

The present disclosure claims the benefit of and priority of provisional U.S. Patent Application Ser. No. 62/958,164, filed on Jan. 7, 2020, entitled "Handling of separate PUCCH configuration for URLLC" ("the '164 provisional"). The disclosure of the '164 provisional is hereby incorporated fully by reference into the present disclosure for all purposes.

FIELD

The present disclosure is related to wireless communication, and specifically, to a Physical Uplink Control Channel (PUCCH) configuration in cellular wireless communication networks.

BACKGROUND

Abbreviations used in this disclosure include:
Abbreviation Full name
3GPP $3^{rd}$ Generation Partnership Project
5G $5^{th}$ Generation
ACK Acknowledgment
BS Base Station
BWP Bandwidth Part
CORESET Control Resource Set
CSI Channel State Information
CSI-RS Channel State Information Reference Signal
DCI Downlink Control Information
DL Downlink
E-UTRA Evolved Universal Terrestrial Radio Access
eMBB enhanced Mobile Broadband
HARQ Hybrid Automatic Repeat Request
HARQ-ACK HARQ Acknowledgement
ID Identifier
IE Information Element
LTE Long Term Evolution
MAC Medium Access Control
MAC CE MAC Control Element
NACK Negative Acknowledgment
NR New Radio
NW Network
PBCH Physical Broadcast Channel
PDCCH Physical Downlink Control Channel
PDSCH Physical Downlink Shared Channel
PHY Physical (layer)
PUCCH Physical Uplink Control Channel
PUSCH Physical Uplink Shared Channel
QCL Quasi Co-Location
RAN Radio Access Network
RF Radio Frequency
RNTI Radio Network Temporary Identifier
RRC Radio Resource Control
RS Reference Signal
SRS Sounding Reference Signal
SS Synchronization Signal
SSB Synchronization Signal Block
TB Transport Block
TCI Transmission Configuration Indication
TS Technical Specification
UE User Equipment
UL Uplink
URLLC Ultra-Reliable and Low-Latency Communication Various efforts have been made to improve different aspects of wireless communication for cellular wireless communication systems, such as 5G NR by improving data rate, latency, reliability, and mobility. The 5G NR system is designed to provide flexibility and configurability to optimize the network services and types, accommodating various use cases such as enhanced Mobile Broadband (eMBB), massive Machine-Type Communication (mMTC), and Ultra-Reliable and Low-Latency Communication (URLLC). However, as the demand for radio access continues to increase, there exists a need for further improvements in the art.

SUMMARY

The present disclosure is related to a PUCCH configuration in cellular wireless communication networks.

According to an aspect of the present disclosure, a UE for configuring PUCCH resources is provided. The UE includes a processor and a memory coupled to the processor. The memory stores a computer-executable program that when executed by the processor, causes the processor to receive a first BWP configuration associated with a first UL BWP, the first BWP configuration including a PUCCH configuration list with a first PUCCH configuration and a second PUCCH configuration, the first PUCCH configuration indicating a first set of PUCCH resource IDs, the second PUCCH configuration indicating a second set of PUCCH resource IDs; and receive a second BWP configuration associated with a second UL BWP, the second BWP configuration including a third PUCCH configuration, the third PUCCH configuration indicating a third set of PUCCH resource IDs. The first set of PUCCH resource IDs and the second set of PUCCH resource IDs share no common PUCCH resource ID.

According to another aspect of the present disclosure, a method performed by a UE for configuring PUCCH resources is provided. The method includes: receiving a first BWP configuration associated with a first UL BWP, the first BWP configuration including a PUCCH configuration list with a first PUCCH configuration and a second PUCCH configuration, the first PUCCH configuration indicating a first set of PUCCH resource IDs, the second PUCCH configuration indicating a second set of PUCCH resource IDs; and receiving a second BWP configuration associated with a second UL BWP, the second BWP configuration including a third PUCCH configuration, the third PUCCH configuration indicating a third set of PUCCH resource IDs. The first set of PUCCH resource IDs and the second set of PUCCH resource IDs share no common PUCCH resource ID.

BRIEF DESCRIPTION OF THE DRAWINGS

Aspects of the present disclosure are best understood from the following detailed disclosure when read with the accompanying drawings. Various features are not drawn to scale. Dimensions of various features may be arbitrarily increased or reduced for clarity of discussion.

DESCRIPTION

Figure 1:
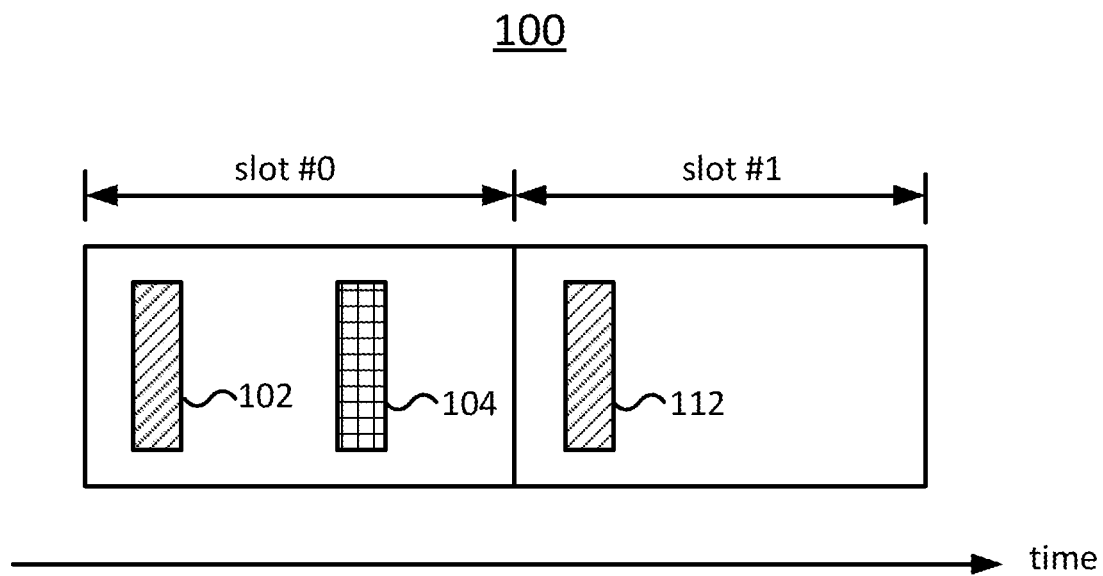
FIG. 1 illustrates a PUCCH transmission related to different HARQ-ACK codebooks according to an example implementation of the present disclosure.

The following contains specific information related to implementations of the present disclosure. The drawings and their accompanying detailed disclosure are merely directed to implementations. However, the present disclosure is not limited to these implementations. Other variations and implementations of the present disclosure will be obvious to those skilled in the art.

Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not illustrated) by the same numerals in the drawings. However, the features in different implementations may be different in other respects and shall not be narrowly confined to what is illustrated in the drawings.

The phrases "in one implementation," or "in some implementations," may each refer to one or more of the same or different implementations. The term "coupled" is defined as connected whether directly or indirectly via intervening components and is not necessarily limited to physical connections. The term "comprising" means "including, but not necessarily limited to" and specifically indicates open-ended inclusion or membership in the so-disclosed combination, group, series or equivalent. The expression "at least one of A, B and C" or "at least one of the following: A, B and C" means "only A, or only B, or only C, or any combination of A, B and C."

The terms "system" and "network" may be used interchangeably. The term "and/or" is only an association relationship for describing associated objects and represents that three relationships may exist such that A and/or B may indicate that A exists alone, A and B exist at the same time, or B exists alone. The character "/" generally represents that the associated objects are in an "or" relationship.

For the purposes of explanation and non-limitation, specific details such as functional entities, techniques, protocols, and standards are set forth for providing an understanding of the disclosed technology. In other examples, detailed disclosure of well-known methods, technologies, systems, and architectures are omitted so as not to obscure the present disclosure with unnecessary details.

Persons skilled in the art will immediately recognize that any network function(s) or algorithm(s) disclosed may be implemented by hardware, software or a combination of software and hardware. Disclosed functions may correspond to modules which may be software, hardware, firmware, or any combination thereof.

A software implementation may include computer-executable instructions stored on a computer-readable medium such as memory or other type of storage devices. One or more microprocessors or general-purpose computers with communication processing capability may be programmed with corresponding executable instructions and perform the disclosed network function(s) or algorithm(s).

The microprocessors or general-purpose computers may include Applications Specific Integrated Circuitry (ASIC), programmable logic arrays, and/or using one or more Digital Signal Processor (DSPs). Although some of the disclosed implementations are oriented to software installed and executing on computer hardware, alternative implementations implemented as firmware or as hardware or as a combination of hardware and software are well within the scope of the present disclosure. The computer-readable medium includes but is not limited to Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture such as a Long Term Evolution (LTE) system, an LTE-Advanced (LTE-A) system, an LTE-Advanced Pro system, or a 5G NR Radio Access Network (RAN) typically includes at least one base station (BS), at least one UE, and one or more optional network elements that provide connection within a network. The UE communicates with the network such as a Core Network (CN), an Evolved Packet Core (EPC) network, an Evolved Universal Terrestrial RAN (E-UTRAN), a 5G Core (5GC), or an internet via a RAN established by one or more BSs.

A UE may include but is not limited to a mobile station, a mobile terminal or device, or a user communication radio terminal. The UE may be a portable radio equipment that includes but is not limited to a mobile phone, a tablet, a wearable device, a sensor, a vehicle, or a Personal Digital Assistant (PDA) with wireless communication capability. The UE is configured to receive and transmit signals over an air interface to one or more cells in a RAN.

The BS may be configured to provide communication services according to at least a Radio Access Technology (RAT) such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UMTS) that is often referred to as 3G based on basic wideband-code division multiple access (W-CDMA), high-speed packet access (HSPA), LTE, LTE-A, evolved LTE (eLTE) that is LTE connected to 5GC, NR (often referred to as 5G), and/or LTE-A Pro. However, the scope of the present disclosure is not limited to these protocols.

The BS may include but is not limited to a node B (NB) in the UMTS, an evolved node B (eNB) in LTE or LTE-A, a radio network controller (RNC) in UMTS, a BS controller (BSC) in the GSM/GERAN, an ng-eNB in an Evolved Universal Terrestrial Radio Access (E-UTRA) BS in connection with 5GC, a next generation Node B (gNB) in the 5G-RAN, or any other apparatus capable of controlling radio communication and managing radio resources within a cell. The BS may serve one or more UEs via a radio interface.

The BS is operable to provide radio coverage to a specific geographical area using a plurality of cells forming the RAN. The BS supports the operations of the cells. Each cell is operable to provide services to at least one UE within its radio coverage.

Each cell (often referred to as a serving cell) provides services to serve one or more UEs within its radio coverage such that each cell schedules the DL and optionally UL resources to at least one UE within its radio coverage for DL and optionally UL packet transmissions. The BS can communicate with one or more UEs in the radio communication system via the plurality of cells.

A cell may allocate sidelink (SL) resources for supporting Proximity Service (ProSe) or Vehicle to Everything (V2X) service. Each cell may have overlapped coverage areas with other cells.

In Multi-RAT Dual Connectivity (MR-DC) cases, the primary cell of a Master Cell Group (MCG) or a Secondary Cell Group (SCG) may be called a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), comprising of the SpCell and optionally one or more Secondary Cells (SCells). An SCG may refer to a group of serving cells associated with the Secondary Node (SN), comprising of the SpCell and optionally one or more SCells.

As previously disclosed, the frame structure for NR supports flexible configurations for accommodating various next generation (e.g., 5G) communication requirements such as Enhanced Mobile Broadband (eMBB), Massive Machine Type Communication (mMTC), and Ultra-Reliable and Low-Latency Communication (URLLC), while fulfilling high reliability, high data rate and low latency requirements. The Orthogonal Frequency-Division Multiplexing (OFDM) technology in the 3GPP may serve as a baseline for an NR waveform. The scalable OFDM numerology such as adaptive sub-carrier spacing, channel bandwidth, and Cyclic Prefix (CP) may also be used.

Two coding schemes are considered for NR, specifically Low-Density Parity-Check (LDPC) code and Polar Code. The coding scheme adaption may be configured based on channel conditions and/or service applications.

At least DL transmission data, a guard period, and a UL transmission data should be included in a transmission time interval (TTI) of a single NR frame. The respective portions of the DL transmission data, the guard period, and the UL transmission data should also be configurable based on, for example, the network dynamics of NR. SL resources may also be provided in an NR frame to support ProSe services or V2X services.

Examples of some terms are provided as follows.

HARQ: A functionality that ensures delivery between peer entities at Layer 1 (e.g., PHY Layer). A single HARQ process may support one TB when the PHY layer is not configured for DL/UL spatial multiplexing. A single HARQ process may support one or multiple TBs when the PHY layer is configured for DL/UL spatial multiplexing. There may be one HARQ entity per serving cell. Each HARQ entity may support parallel processing of (e.g., multiple) DL and UL HARQ processes.

HARQ-ACK: HARQ-ACK may include a 1-bit indicator, where the HARQ-ACK may be a negative Acknowledgement (NACK) when the bit value of the indicator is set to a first value (e.g., "0") and may be a positive Acknowledgement (ACK) when the bit value of the indicator is set to a second value (e.g., "1").

To achieve a low latency requirement, at least two HARQ-ACK codebooks may be simultaneously constructed for supporting different service types for a UE. Since HARQ-ACK codebooks transmitted on different PUCCH resources correspond to different service types, configuring the parameters in a PUCCH configuration (e.g., PUCCH-Config IE) separately can lead to high flexibility on scheduling. Accordingly, PUCCH spatial relation information (e.g., PUCCH-SpatialRelationInfo IE) and sub-slot configuration can be separately configured for different HARQ-ACK codebooks. PUCCH-SpatialRelationInfo provides information about a spatial domain filter of the PUCCH that the UE uses (e.g., for reception of a SS/PBCH block, reception of a CSI-RS, or transmission of an SRS).

A spatial setting for a PUCCH transmission may be provided by PUCCH-SpatialRelationInfo if the UE is configured with a single value for PUCCH spatial relation information ID (e.g., pucch-SpatialRelationInfoId IE); otherwise, the UE may determine a spatial setting for the PUCCH transmission by a PUCCH spatial relation activation/deactivation MAC CE if the UE is provided multiple values for PUCCH-SpatialRelationInfo. Furthermore, only a single PUCCH spatial relation information can be active for a PUCCH resource at a time.

After determining a spatial setting for the PUCCH transmission, the UE may apply the corresponding setting for a spatial domain filter to transmit the PUCCH 3 ms after the UE transmits HARQ-ACK information with an ACK value corresponding to a PDSCH reception providing the PUCCH-SpatialRelationInfo.

FIG. 1 illustrates a PUCCH transmission 100 related to different HARQ-ACK codebooks according to an example implementation of the present disclosure. PUCCH resource 102 with PUCCH resource ID #1 in slot #0 is for eMBB HARQ-ACK transmission. PUCCH resource 104 with PUCCH resource ID #2 in slot #0 is for URLLC HARQ-ACK transmission. PUCCH resource 112 with PUCCH resource ID #1 in slot #1 is for URLLC HARQ-ACK transmission. PUCCH resource 102 and PUCCH resource 112 corresponding to HARQ-ACK for different service types are transmitted in the PUCCH with the same PUCCH resource ID. Because a spatial relation for a PUCCH resource of a serving cell is activated or deactivated by a MAC CE received from the network, immediate switch between different spatial relation settings may not be made when different HARQ-ACK codebooks corresponding to the same PUCCH resource ID are constructed for supporting different service types. For example, PUCCH resource 102 and PUDCCH resource 112 are separated by 1 slot, while receiving and applying a PUCCH spatial relation activation/deactivation MAC CE may take 3 slots.

In other words, even though spatial setting can be separately configured for different HARQ-ACK codebooks, there may still put a timing-related constraint. Besides, it takes time to apply the determined spatial setting to the PUCCH resource. Therefore, there may be an adverse impact on reliability for the PUCCH resource transmitting URLLC HARQ-ACK codebook, such as PUCCH resource 112, when the spatial setting for PUCCH resource cannot be properly changed or scheduled.

Implementations disclosed subsequently relate to improved methods, systems, devices, and apparatuses that support separate spatial setting for different HARQ-ACK codebooks. Any two or more than two of the implementations, cases, paragraphs, (sub)-bullets, points, actions, behaviors, terms, or claims disclosed in the present disclosure may be combined logically, reasonably, and properly to form a specific method.

Case 1: More than One PUCCH Configuration (e.g., PUCCH-Config) or More than One Configuration Corresponding to PUCCH Transmission are Configured to a UE Case 1-1: The UE May Receive a PUCCH Spatial Relation Activation/Deactivation MAC CE Corresponding to Rel-16.

In other words, there may be a new PUCCH spatial relation activation/deactivation MAC CE for Rel-16. The new PUCCH spatial relation activation/deactivation MAC CE may be identified by a new Logical Channel ID (LCID).

In one implementation, content fields in the Rel-16 MAC CE may be the same as those in Rel-15. When the PUCCH transmission is indicated as a high priority or a different service type from Rel-15, the UE may activate PUCCH spatial relation information by a Rel-16 PUCCH spatial relation activation/deactivation MAC CE.

In one implementation, content fields in the Rel-16 MAC CE may include an index corresponding to the priority, such as a priority index, a PUCCH-Config index, or any other index referring to different service types.

Case 1-2: The UE May Receive a PUCCH Spatial Relation Activation/Deactivation MAC CE that Includes a Content Field Used to Identify an Index of a PUCCH Configuration.

The index (or identification) of the PUCCH configuration may correspond to a service type. In one implementation, the index (or identification) of the PUCCH configuration may be an index associated with the service type in accordance with the configuration for the service type. In one implementation, the index (or identification) of the PUCCH configuration may be an index corresponding to a priority indicator. In other words, the first PUCCH configuration may refer to a PUCCH with low priority, and the second PUCCH configuration may refer to a PUCCH with high priority. Alternatively, the first PUCCH configuration may refer to a PUCCH with high priority, and the second PUCCH configuration may refer to a PUCCH with low priority.

Figure 2:
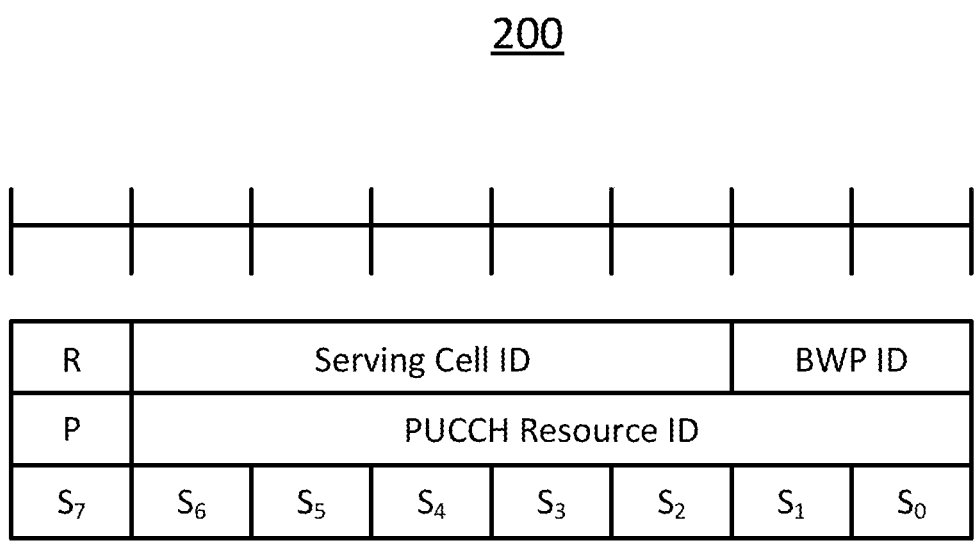
FIG. 2 illustrates an enhanced PUCCH spatial relation activation/deactivation MAC CE according to an example implementation of the present disclosure.

FIG. 2 illustrates an enhanced PUCCH spatial relation activation/deactivation MAC CE 200 according to an example implementation of the present disclosure. The PUCCH spatial relation activation/deactivation MAC CE 200 may have a fixed size of 24 bits (three octets), including oct 1, oct 2 and oct 3.

The Serving Cell ID field indicates the identity of the serving cell for which the MAC CE 200 applies. The length of the Serving Cell ID field is 5 bits.

The BWP ID field indicates a UL BWP for which the MAC CE 200 applies as the codepoint of the DCI bandwidth part indicator field as specified in TS 38.212. The length of the BWP ID field is 2 bits.

The PUCCH Resource ID field contains an identifier of the PUCCH resource ID identified by PUCCH-ResourceId as specified in TS 38.331. The length of the PUCCH Resource ID field is 7 bits;

The $S_i$ field (i is an integer, $S_7$-$S_0$ illustrated in FIG. 2): If there is PUCCH Spatial Relation information with PUCCH-SpatialRelationInfoId as specified in TS 38.331, configured for the UL BWP indicated by the BWP ID field, $S_i$ indicates the activation status of PUCCH spatial relation information with PUCCH-SpatialRelationInfoId equal to i+1, otherwise the MAC entity may ignore this field. The $S_i$ field may be set to 1 to indicate that PUCCH spatial relation information with PUCCH-SpatialRelationInfoId equal to i+1 shall be activated. The $S_i$ field may be set to 0 to indicate that PUCCH spatial relation information with PUCCH-SpatialRelationInfoId equal to i+1 shall be deactivated. Only a single PUCCH spatial relation information can be active for a PUCCH resource at a time. The oct 3 including $S_7$-$S_0$ may be also referred to as a bitmap.

The R field is a reserved bit, which may be set to 0.

In one implementation, the P field illustrated in FIG. 2 may be the content field used to identify an index of a PUCCH configuration in case 1-2.

In one implementation, the index may be a PUCCH configuration index (e.g., PUCCH-ConfigId:0, PUCCH-ConfigId:1) in a PUCCH configuration list (e.g., PUCCH-ConfigList).

In one implementation, the index may correspond to the PUCCH configuration (e.g., PUCCH-Config) for Rel-15 or Rel-16 (e.g., 0 is for Rel-15, and 1 is for Rel-16).

In one implementation, the index may correspond to the index in the PUCCH-Config.

Table 1 illustrates an example data structure of a BWP configuration associated with a UL BWP, the BWP configuration including a PUCCH configuration list.

TABLE 1

```
-- ASN1START
-- TAG-BWP-UPLINKDEDICATED-START
BWP-UplinkDedicated ::=         SEQUENCE {
pucch-ConfigList                SetupRelease { PUCCH-ConfigList }
...
}
PUCCH-ConfigList ::=            SEQUENCE
                                (SIZE (1..maxNrofPUCCH-configs)) OF
PUCCH-Config
-- TAG-BWP-UPLINKDEDICATED-STOP
-- ASN1STOP
```

In one implementation, the index may be a priority index provided for the PUCCH transmission. The priority index may correspond to an indication in a DCI scheduling the PUCCH transmission. The priority index may be provided in the PUCCH configuration.

In one implementation, the index may be a group index configured for the PUCCH transmission. The group index may be configured in the PUCCH configuration. The group index may be configured in the PUCCH-Config in which the PUCCH resource is configured. The group index may be indicated in DCI scheduling PUCCH transmission and/or configured in a CORESET configuration associated with the DCI scheduling the PUCCH transmission, where the DCI is monitored/received in the search space indicated by the CORESET configuration.

Case 1-3: The UE May Receive a PUCCH Spatial Relation Activation/Deactivation MAC CE that does not Include a Content Field Used to Identify an Index of a PUCCH Configuration.

In one implementation, the PUCCH spatial relation information may be configured with the same indices (e.g., same pucch-SpatialRelationInfoId) in the first PUCCH-Config indicated as a low priority and in the second PUCCH-Config indicated as a high priority. More specifically, different PUCCH configurations may correspond to different priorities. A PUCCH-Config including the PUCCH spatial relation information to be applied may be indicated by a priority indication in the DCI scheduling a PDSCH containing the PUCCH spatial relation activation/deactivation MAC CE.

In one implementation, the PUCCH resources may be configured with the same PUCCH resource IDs in the first PUCCH-Config indicated as a low priority and in the second PUCCH-Config indicated as a high priority. A PUCCH-Config including the PUCCH resource to be applied may be indicated by a priority indication in the DCI scheduling a PDSCH containing the PUCCH spatial relation activation/deactivation MAC CE.

In one implementation, the PUCCH spatial relation information may be configured only in the PUCCH-Config indicated as a low priority or only in the Rel-15 PUCCH-Config. There may be two configured spatialRelationInfoToAddModList and the index of PUCCH spatial relation information (e.g., PUCCH-SpatialRelationInfoID) configured in different spatialRelationInfoToAddModList may be the same. The index of the spatialRelationInfoToAddModList associated with the PUCCH spatial relation information to be applied may be indicated by a priority indication in the DCI scheduling the PDSCH containing the PUCCH spatial relation activation/deactivation MAC CE.

In one implementation, more than one PUCCH spatial relation information may be active for a PUCCH resource at a time by a MAC CE. The same PUCCH resource ID may be configured in the first PUCCH-Config indicated as a low priority and in the second PUCCH-Config indicated as a high priority.

If the PUCCH spatial relation information is configured with the same indices in the first PUCCH-Config indicated as a low priority and in the second PUCCH-Config indicated as a high priority, the PUCCH spatial relation information with a low priority and the PUCCH spatial relation information with a high priority may be configured in the first PUCCH-Config and the second PUCCH-Config, respectively. If the PUCCH spatial relation information is configured with the same indices in the first spatialRelationInfoToAddModList and the second spatialRelationInfoToAddModList in a PUCCH-Config, the PUCCH spatial relation information with a low priority and the PUCCH spatial relation information with a high priority may be configured in the first spatialRelationInfoToAddModList and the second spatialRelationInfoToAddModList, respectively.

In one implementation, a PUCCH-SpatialRelationInfo IE may include multiple sets of referenceSignal, pucch-PathlossReferenceRS-Id, p0-PUCCH-Id, and closedLoopIndex. Each set may correspond to a specific PUCCH-Config index or a specific priority level (e.g., high priority or low priority).

Case 1-4: The UE May Receive a PUCCH Spatial Relation Activation/Deactivation MAC CE that Includes a Content Field Used to Identify the State of a PUCCH Spatial Relation Information.

The state of the PUCCH spatial relation information may include the active state of the PUCCH spatial relation information.

In one implementation, more than one PUCCH Spatial Relation information may be active (e.g., activated by the MAC CE) for a PUCCH resource at a time.

The applied PUCCH spatial relation information for the PUCCH transmission may correspond to a priority index provided for the PUCCH transmission. For example, the activated PUCCH spatial relation information with a low index may refer to the PUCCH transmission indicated as a low priority, and the activated PUCCH spatial relation information with a high index may refer to the PUCCH transmission indicated as a high priority. Alternatively, the activated PUCCH spatial relation information with a low index may refer to the PUCCH transmission indicated as a high priority, and the activated PUCCH spatial relation information with a high index may refer to the PUCCH transmission indicated as a low priority. More specifically, if both S0 and S2 are set to 1 in the PUCCH spatial relation activation/deactivation MAC CE, the UE may determine that the spatial setting applied to the PUCCH transmission is the PUCCH spatial relation information with PUCCH-SpatialRelationInfoId equal to 1 (corresponding to $S_0$) when the PUCCH resource indicated by the DCI corresponds to a high priority or the PUCCH transmission configured by the PUCCH-Config is identified as a high priority (e.g., PUCCH-Config-Rel16). Similarly, the UE may determine that the spatial setting applied to the PUCCH transmission is the PUCCH spatial relation information with PUCCH-SpatialRelationInfoId equal to 3 (corresponding to $S_2$) when the PUCCH resource indicated by the DCI corresponds to a low priority or the PUCCH transmission configured by the PUCCH-Config is identified as a low priority.

It should be noted that a PUCCH spatial relation activation/deactivation MAC CE indicating more than one active state may be used to indicate a PUCCH resource ID that has been configured in more than one PUCCH-Config in the same BWP. The UE may apply the PUCCH spatial relation information with a smaller PUCCH-SpatialRelationInfoID indicated as active in the MAC CE for the PUCCH resource indicated as a high priority by a DCI message and apply the PUCCH spatial relation information with a larger PUCCH-SpatialRelationInfoID indicated as active in the MAC CE for the PUCCH resource indicated as a low priority by a DCI message. Alternatively, the UE may apply the PUCCH spatial relation information with a smaller PUCCH-SpatialRelationInfoID indicated as active in the MAC CE for the PUCCH resource indicated as a low priority by a DCI message and apply the PUCCH spatial relation information with a larger PUCCH-SpatialRelationInfoID indicated as active in the MAC CE for the PUCCH resource indicated as a high priority by a DCI message.

It should be noted that even though PUCCH resources with the same PUCCH Resource ID are configured in the first PUCCH-Config of low priority and the second PUCCH-Config of high priority, the PUCCH resources in the first PUCCH-Config and the PUCCH resources in the second PUCCH-Config may not have the same PUCCH resource configuration (e.g., use the same PUCCH format).

It should be noted that in a case that a PUCCH spatial relation activation/deactivation MAC CE indicates only one active PUCCH spatial relation information, $S_i$, for a PUCCH resource ID of a BWP, it may imply that $S_i$ is activated for the PUCCH resource ID configured in each PUCCH-Config of the BWP.

In one implementation, the activated PUCCH spatial relation information may be specified by an index instead of a bitmap. The activation status of PUCCH spatial relation information may correspond to an index PUCCH-SpatialRelationInfoId.

Figure 3:
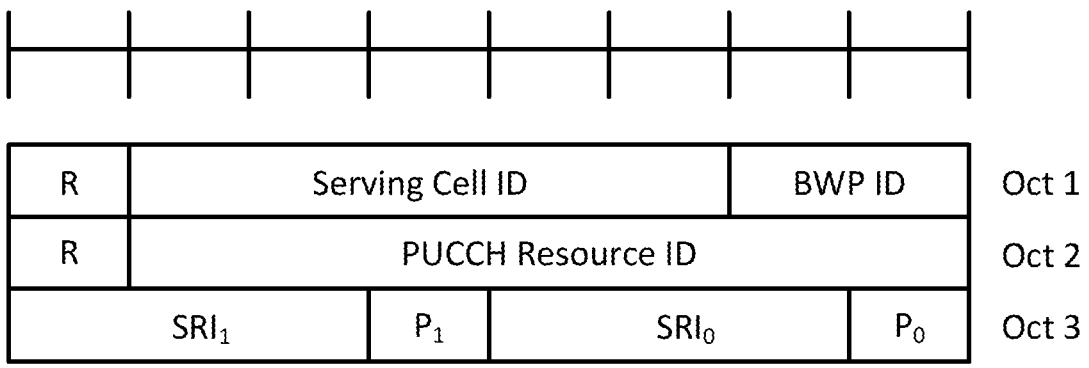
FIG. 3 illustrates an enhanced PUCCH spatial relation activation/deactivation MAC CE according to another example implementation of the present disclosure.

PUCCH spatial relation information applied to the PUCCH transmission may be indicated by a priority index and a PUCCH-SpatialRelationInfoID. FIG. 3 illustrates an enhanced PUCCH spatial relation activation/deactivation MAC CE 300 according to an example implementation of the present disclosure. The PUCCH spatial relation activation/deactivation MAC CE 300 may have 24 bits, including Oct 1, Oct 2 and Oct 3. The $SRI_i$ field (i is an integer, $SRI_0$ and $SRI_1$ illustrated in FIG. 3), which may have 3 bits, indicates an index of a PUCCH spatial relation information to be activated, i being equal to 0 or 1. The $P_i$ field (i is an integer, $P_0$ and $P_1$ illustrated in FIG. 3), which may have 1 bit, indicates a priority index associated with the $SRI_i$ field.

PUCCH spatial relation information with PUCCH-SpatialRelationInfoId equal to SRI0 is applied to a PUCCH transmission indicated by the priority index P0 (the value of $P_0$ is 0 or 1), and PUCCH spatial relation information with PUCCH-SpatialRelationInfoId equal to SRI1 is applied to a PUCCH transmission indicated by the priority index P1 (the value of $P_1$ is 0 or 1). It should be noted that the position of each field in FIG. 3 is exemplary rather than limiting. In one implementation P0 may be followed by P1 as well. Furthermore, the UE may associate the priority index illustrated in FIG. 3 with a priority indicator in the DCI or a PUCCH-Config index. For example, PUCCH-Config 0 may correspond to P0 and PUCCH-Config 1 may correspond to P1.

Case 1-5: The UE May Receive a PUCCH Configuration that Includes an Indicator of PUCCH Spatial Relation Information Associated with the Service Type.

The PUCCH configuration may indicate a set of PUCCH spatial relation information IDs (e.g., pucch-SpatialRelationInfoId). In one implementation, the number of pucch-SpatialRelationInfoId may be different from that in Rel-15 (e.g., more than 8). The number of IDs in the set of PUCCH spatial relation information IDs may be maxNrofSpatialRelationInfos. The value of maxNrofSpatialRelationInfos in the PUCCH configuration may be greater than 8 (e.g., 16).

In one implementation, the PUCCH resources configured in different PUCCH configurations may be different. For example, if there are 16 pucch-SpatialRelationInfoId configured to the UE, half of the configured PUCCH spatial relation information IDs (e.g., 0-7) may be configured in a PUCCH-Config indicated as a high priority, and the other half of the configured PUCCH spatial relation information IDs (e.g., 8-15) may be configured in another PUCCH-Config indicated as a low priority.

Figure 4:
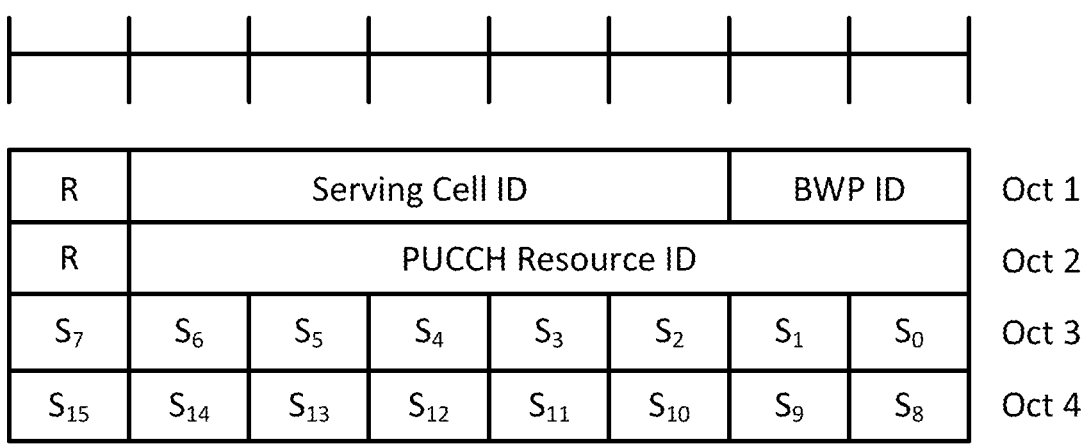
FIG. 4 illustrates an enhanced PUCCH spatial relation activation/deactivation MAC CE according to still another example implementation of the present disclosure.

FIG. 4 illustrates an enhanced PUCCH spatial relation activation/deactivation MAC CE 400 according to an example implementation of the present disclosure. The PUCCH spatial relation activation/deactivation MAC CE 400 may have 32 bits, including Oct 1, Oct 2, Oct 3 and Oct 4. Description of each field may refer to the MAC CE 200 illustrated in FIG. 2. The length of the $S_i$ field (i is an integer, $S_{15}$-$S_0$ illustrated in FIG. 4) in the MAC CE 400 is increased to 16 since there are 16 pucch-SpatialRelationInfoId configured to the UE.

Case 1-6: The UE May Receive a PUCCH Spatial Relation Activation/Deactivation MAC CE that Indicates Deactivation of all PUCCH Spatial Relation Information for a PUCCH Resource ID in a BWP.

In this example, the UE may apply default spatial relation(s) to the PUCCH resource(s) corresponding to the PUCCH resource ID in the BWP.

In one implementation, if the PUCCH resource ID indicated in the MAC CE is configured in more than one PUCCH-Config, the PUCCH resources corresponding to the PUCCH resource ID configured in different PUCCH-Config may have separate default spatial relations. The default spatial relation for a PUCCH resource may be the PUCCH spatial relation information with the smallest PUCCH-SpatialRelationInfoID in the associated spatialRelationInfoToAddModList of the PUCCH resource in the BWP.

A PUCCH-Config may explicitly or implicitly indicate correlation between a PUCCH resource and spatialRelationInfoToAddModList when each PUCCH-Config contains only one spatialRelationInfoToAddModList. Alternatively, a spatialRelationInfoToAddModList may be configured with a priority, and the PUCCH spatial relation information in the spatialRelationInfoToAddModList is associated with the PUCCH resources of the configured priority.

In one implementation, if the PUCCH resource ID indicated in the MAC CE corresponds to more than one priority level (e.g., high priority or low priority), the PUCCH resources with the PUCCH resource ID that corresponds to different priorities may have separate default spatial relations. The default spatial relation for the PUCCH resource may be the PUCCH spatial relation information with the smallest PUCCH-SpatialRelationInfoID in the associated spatialRelationInfoToAddModList of the PUCCH resource in the BWP.

A PUCCH-Config may explicitly or implicitly indicate correlation between a PUCCH resource and spatialRelationInfoToAddModList when each PUCCH-Config contains only one spatialRelationInfoToAddModList. Alternatively, a spatialRelationInfoToAddModList may be configured with a priority, and the PUCCH spatial relation information in the spatialRelationInfoToAddModList is associated with the PUCCH resources of the configured priority.

In one implementation, if the PUCCH resource ID indicated in the MAC CE is configured in more than one PUCCH-Config, each of which is associated with a group of CORESET configurations, the PUCCH resources corresponding to the PUCCH resource ID configured in different PUCCH-Config may have separate default spatial relations. A CORESET configuration includes a group index to identify to which group the CORESET belongs. The default spatial relation for a PUCCH resource may be the TCI state or QCL assumption for the CORESET with the lowest CORESET ID in the CORESET group associated with the scheduled PUCCH resource in the BWP.

In one implementation, the PUCCH resources configured in different PUCCH-Config may be different. More specifically, different PUCCH resource IDs may be configured in different PUCCH configurations.

For example, a UE is configured with 128 PUCCH resources and two PUCCH configurations, including a first PUCCH-Config and a second PUCCH-Config. Although the UE may select PUCCH resource from 128 PUCCH resource candidates (e.g., PUCCH-ResourceId ranged from 0-127) for the first PUCCH-Config and the second PUCCH-Config, the PUCCH-ResourceId of PUCCH resources included in a resourceToAddModList in respective PUCCH-Config may not be the same.

For example, if the first PUCCH-Config includes PUCCH resources with PUCCH-ResourceID of {0, 2, 4, 6}, PUCCH resources included in the second PUCCH-Config may not be selected from PUCCH-ResourceID equal to 0, 2, 4, or 6. The second PUCCH-Config may include PUCCH resources with PUCCH-ResourceID of {1, 3, 5, 7}.

For example, if maximum number of PUCCH resources is 128, the PUCCH resources configured in the first PUCCH-Config may be configured with PUCCH-ResourceId equal to 0-63, and the PUCCH resources configured in the second PUCCH-Config may be configured with PUCCH-ResourceId equal to 64-127.

In one implementation, the first PUCCH-Config and the second PUCCH-Config may correspond to different service types. For example, the first PUCCH-Config may correspond to the eMBB service, whereas the second PUCCH-Config may correspond to the URLLC service. In other words, the first PUCCH-Config may correspond to low priority, whereas the second PUCCH-Config may correspond to high priority.

Case 1-7: A PUCCH-Config, PUCCH-ResourceSet, PUCCH-Resource May be Mapped to a Specific Priority Level (e.g., High Priority or Low Priority).

In one implementation, the PUCCH-Config IE may indicate a priority level to which the configured PUCCH-Config is mapped. For example, if there are two PUCCH configurations in a PUCCH configuration list, the first PUCCH-Cong may correspond to a low priority and the second PUCCH-Config may correspond to a high priority.

In one implementation, the PUCCH-ResourceSet IE may indicate a priority level to which the configured PUCCH-Config is mapped. For example, if there are two PUCCH resource sets, the first PUCCH resource set may correspond to a low priority and the second PUCCH resource set may correspond to a high priority.

In one implementation, the PUCCH-Resource IE may indicate a priority level to which the configured PUCCH-Config is mapped. For example, if there are two PUCCH resources, the first PUCCH resource may correspond to a low priority and the second PUCCH resource may correspond to a high priority.

Case 1-8: A DCI Message May Include an Indicator of PUCCH Configuration.

In one implementation, the PUCCH resource indicated by a DCI message may correspond to different PUCCH configurations. For example, the PUCCH transmission indicated by the DCI (e.g., PUCCH resource indicator) with a high priority index may correspond to the PUCCH-Config for Rel-16. More specifically, the DCI used to schedule the PUCCH transmission may include a priority index. If the priority index refers to a high priority, the PUCCH resource may be configured in the PUCCH-Config for Rel-16. In other words, there are two HARQ-ACK codebooks scheduled by DCI with different priorities in two PUCCH resources, and the two PUCCH resources are configured in PUCCH-Config for Rel-15 and PUCCH-Config for Rel-16, respectively.

In one implementation, the corresponding PUCCH configuration index may be indicated by a field in the DCI message. For example, the field for indicating the PUCCH configuration index may have a bit length of 1, with its value 0 referring to PUCCH-Config for Rel-15 and value 1 referring to PUCCH-Config for Rel-16. Alternatively, value 0 may refer to PUCCH-Config for Rel-16 and value 1 may refer to PUCCH-Config for Rel-15.

Case 1-9: Each Configured PUCCH Configuration is Associated with a Group of CORESET Configurations.

In one implementation, a CORESET configuration includes a group index for identifying to which CORESET group the CORESET belongs.

In one implementation, a PUCCH spatial relation activation/deactivation MAC CE may include the group index, and the UE may apply the identified PUCCH spatial relation information to the PUCCH resource in the indicated PUCCH-Config.

In one implementation, a PUCCH spatial relation activation/deactivation MAC CE may not include the group index, and the UE may apply the identified PUCCH spatial relation information to the PUCCH resource in the PUCCH-Config associated with the CORESET group in which the DCI scheduling the PDSCH containing the PUCCH spatial relation activation/deactivation MAC CE is transmitted.

Case 2: Only a Single PUCCH Configuration or a Single Configuration Corresponding to the PUCCH Transmission is Configured to the UE It should be noted that implementation may include combination of implementations disclosed in Case 1. For example, indices corresponding to 'different PUCCH-Config' in Case 1 may be associated with indices corresponding to 'different spatial relation information lists' (or 'different lists') in Case 2. A 'list' in Case 2 refers to a 'spatial relation information list'.

Case 2-1: The UE May Receive Identification of the PUCCH Spatial Relation Information Corresponding to the Service Type.

The PUCCH spatial relation activation/deactivation MAC CE may include a content field that indicates the identification of the spatial relation information corresponding to the service type. The identification of the PUCCH spatial relation information may be an index of a PUCCH spatial relation information list. In other words, there may be more than one spatialRelationInfoToAddModList (e.g., spatialRelationInfoToAddModList1, spatialRelationInfoToAddModList2) in the PUCCH configuration. Furthermore, different lists may correspond to different service types.

In one implementation, the UE may receive the MAC CE that includes the indices corresponding to different spatial relation information lists. In one implementation, the PUCCH-SpatialRelationInfoId of the PUCCH spatial relation information in different lists may have the same value. In one implementation, the PUCCH-SpatialRelationInfoId of the PUCCH spatial relation information in different lists may have different values.

In one implementation, PUCCH spatial relation information configured in a list may be replaced by other PUCCH spatial relation information configured in another list. For example, if the first PUCCH spatial relation information configured in the first list and the second PUCCH spatial relation information configured in the second list are activated or indicated for the same PUCCH transmission, the UE may apply the PUCCH spatial relation information in the list with a high priority.

In one implementation, the PUCCH resource ID corresponding to the first list and the PUCCH resource ID corresponding to the second list may be different. For example, PUCCH-ResourceId 0-63 may be indicated to apply the PUCCH spatial relation information in the first list, and PUCCH-ResourceId 64-127 may be indicated to apply the PUCCH spatial relation information in the second list.

In one implementation, there may be a PUCCH spatial relation activation/deactivation MAC CE for Rel-16 corresponding to the PUCCH spatial relation in a list for different service types. For example, the PUCCH spatial relation activation/deactivation MAC CE for Rel-16 may correspond to the first list. Alternatively, the PUCCH spatial relation activation/deactivation MAC CE for Rel-16 may correspond to the second list.

Case 2-2: If there is No Different List in the PUCCH-Config, More than One PUCCH Spatial Relation Information May be Active for a PUCCH Resource at a Time.

The PUCCH spatial relation activation/deactivation MAC CE may include a content field that indicates the activation status of the PUCCH spatial relation information. The active state of the PUCCH Spatial Relation information may refer to an index of PUCCH-SpatialRelationInfoId.

In one implementation, there may be more than one bit equal to '1' in the $S_i$ field of the PUCCH spatial relation activation/deactivation MAC CE. In one implementation, the UE may apply an activated PUCCH spatial relation information in the MAC CE with the lowest index for the PUCCH transmission corresponding to a high priority. In an alternative implementation, the UE may apply an activated PUCCH spatial relation information in the MAC CE with the highest index for the PUCCH transmission corresponding to a high priority.

In one implementation, a PUCCH resource may be configured with more than one PUCCH resource ID, each TD associated with a priority or a service type used for the PUCCH transmission. The UE may apply the activated PUCCH spatial relation information to the PUCCH resource with the PUCCH resource ID indicated in the PUCCH spatial relation activation/deactivation MAC CE.

Table 2 illustrates an example data structure of a PUCCH resource configuration including more than one PUCCH resource ID associated with different priorities or different service types. The PUCCH resource IDs includes pucch-ResourceId and pucch-ResourceIdForHighPriority.

TABLE 2

```
PUCCH-Resource ::=           SEQUENCE {
  pucch-ResourceId                PUCCH-ResourceId, OPTIONAL, --
Need R
  pucch-ResourceIdForHighPriority   PUCCH-ResourceId, OPTIONAL, -- Need
R
  startingPRB                 PRB-Id,
  intraSlotFrequencyHopping       ENUMERATED { enabled }
OPTIONAL, -- Need R
  secondHopPRB                PRB-Id
OPTIONAL, -- Need R
  format                      CHOICE {
    format0                       PUCCH-format0,
    format1                       PUCCH-format1,
    format2                       PUCCH-format2,
    format3                       PUCCH-format3,
    format4                       PUCCH-format4
  }
}
```

There may be only one bit equal to '1' in the $S_i$ field of the PUCCH spatial relation activation/deactivation MAC CE.

The priority or service type and the associated PUCCH resource ID for a PUCCH transmission may be indicated in a DCI message scheduling the PUCCH transmission. The pucch-ResourceIdForHighPriority value may be used when the DCI message indicates a high priority for the PUCCH transmission.

For a PUCCH resource, the PUCCH resource TDs associated with different priorities or different service types may have different values. More than one PUCCH spatial relation information may be active for a PUCCH resource if both pucch-ResourceId and pucch-ResourceIdForHighPriority are configured for the PUCCH resource.

For a PUCCH resource, the PUCCH resource IDs associated with different priority or service types may be configured as the following example:

Case 2-3: The UE May Receive an Identification of a Group of PUCCH Resources.

In one implementation, the identification of the group of PUCCH resources may be an explicit group index. In one implementation, the identification of the group of PUCCH resources may be an index of an associated CORESET configuration.

In one implementation, the group of a PUCCH resource may be configured as the following example:

Table 3 illustrates an example data structure of a PUCCH resource configuration including a PUCCH resource ID and a PUCCH resource group ID.

TABLE 3

```
PUCCH-Resource ::=           SEQUENCE {
  pucch-ResourceId                PUCCH-ResourceId, OPTIONAL, --
Need R
  pucch-ResourceGroupId           PUCCH-ResourceGroupId, OPTIONAL,
-- Need R
  startingPRB                 PRB-Id,
  intraSlotFrequencyHopping       ENUMERATED { enabled }
OPTIONAL, -- Need R
```

TABLE 3-continued

```
  secondHopPRB                PRB-Id
OPTIONAL, -- Need R
  format                      CHOICE {
    format0                       PUCCH-format0,
    format1                       PUCCH-format1,
    format2                       PUCCH-format2,
```

TABLE 3-continued

```
    format3                       PUCCH-format3,
    format4                       PUCCH-format4
  }
}
```

In one implementation, a PUCCH spatial relation activation/deactivation MAC CE may include the group index of the PUCCH resources.

If a UE receives a PUCCH spatial relation activation/deactivation MAC CE including a group index of the PUCCH resources, the UE may apply the PUCCH spatial relation information to all the PUCCH resources in the group.

If a UE receives both a PUCCH spatial relation activation/deactivation MAC CE including a group index of the PUCCH resources and a PUCCH spatial relation activation/deactivation MAC CE without a group index of the PUCCH resources, the UE may apply the PUCCH spatial relation information indicated in the MAC CE without the group index to the indicated PUCCH resource.

Figure 5:
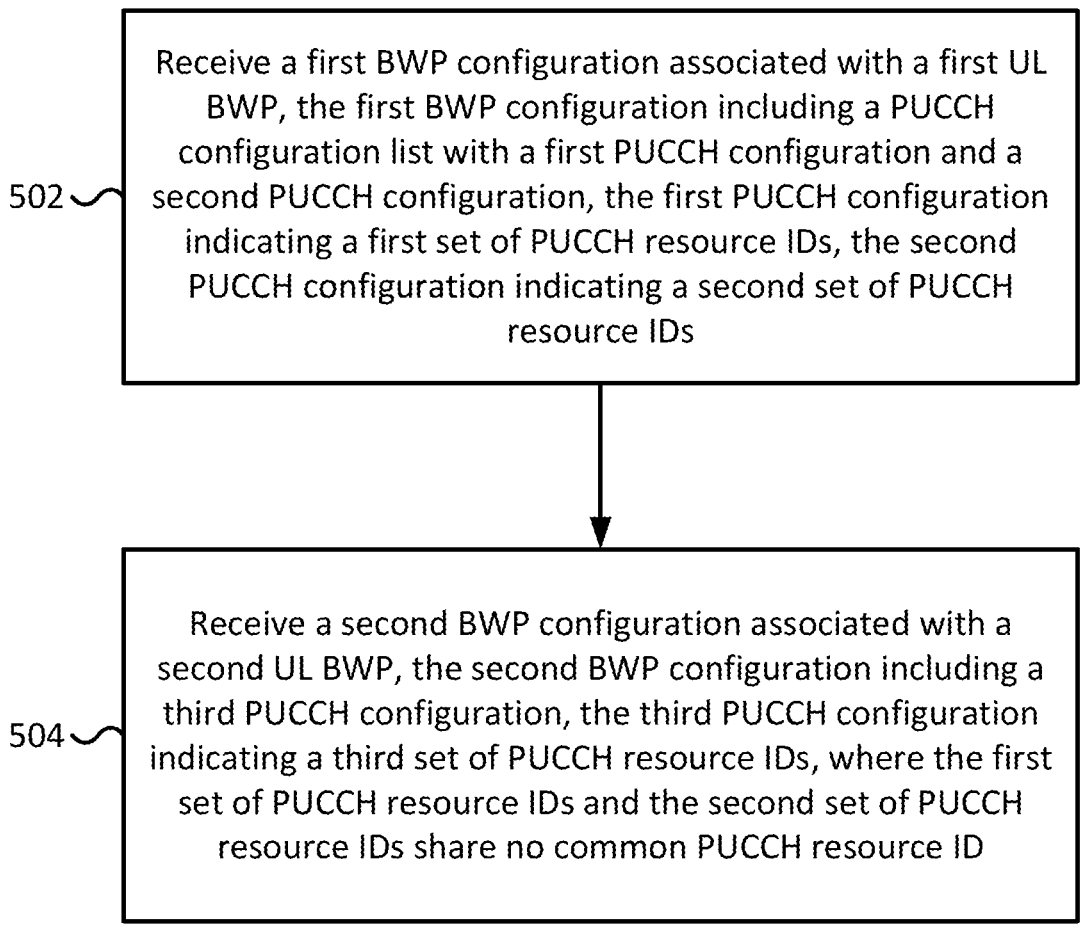
FIG. 5 illustrates a method for configuring PUCCH resources according to an example implementation of the present disclosure.

FIG. 5 illustrates a method 500 for configuring PUCCH resources according to an example implementation of the present disclosure. In action 502, the UE receives a first BWP configuration associated with a first UL BWP. The first BWP configuration includes a PUCCH configuration list with a first PUCCH configuration and a second PUCCH configuration. The first PUCCH configuration indicates a first set of PUCCH resource IDs. The second PUCCH configuration indicates a second set of PUCCH resource IDs.

An example BWP configuration including a PUCCH configuration list may refer to Table 1. The PUCCH configuration list (e.g., PUCCH-ConfigList IE) may include the first PUCCH configuration (e.g., PUCCH-Config0) and the second PUCCH configuration (e.g., PUCCH-Config1).

In action 504, the UE receives a second BWP configuration associated with a second UL BWP. The second BWP configuration includes a third PUCCH configuration. The third PUCCH configuration indicates a third set of PUCCH resource IDs. The first set of PUCCH resource IDs and the second set of PUCCH resource IDs share no common PUCCH resource ID.

The data structure of the second BWP configuration associated with the second UL BWP may be similar to the data structure of the first BWP configuration associated with the first UL BWP. In one implementation, the first BWP configuration may include two PUCCH configurations (the first and second PUCCH configurations), whereas the second BWP configuration may include a single PUCCH configuration (the third PUCCH configuration).

In one implementation, PUCCH resources in the first PUCCH configuration and PUCCH resources in the second PUCCH configuration may not be the same. In other words, the first set of PUCCH resource IDs and the second set of PUCCH resource IDs share no common PUCCH resource ID. Related disclosure may refer to implementations in Case 1-6.

In one implementation, there may be no specific restriction regarding how PUCCH resources are configured for different BWP configurations. For example, PUCCH resources in the first PUCCH configuration associated with the first UL BWP and PUCCH resources in the third PUCCH configuration associated with the second UL BWP may have the same PUCCH resource ID. In other words, the first set of PUCCH resource IDs may share at least one PUCCH resource ID with the third set of PUCCH resource IDs.

In one implementation, there may also be restriction regarding PUCCH resources configured for different BWP configurations. For example, PUCCH resources in the first PUCCH configuration and PUCCH resources in the third PUCCH configuration may not be the same. In other words, the first set of PUCCH resource IDs and the third set of PUCCH resource IDs share no common PUCCH resource ID.

In one implementation, the first PUCCH configuration and the second PUCCH configuration may correspond to different service types. Different service types may correspond to different priorities. For example, the first PUCCH configuration may correspond to the eMBB service, whereas the second PUCCH configuration may correspond to the URLLC service. For example, the first PUCCH configuration may correspond to a low priority, whereas the second PUCCH configuration may correspond to a high priority.

In one implementation, a first PUCCH resource selected from the first set of PUCCH resource IDs for transmitting a first HARQ-ACK codebook and a second PUCCH resource selected from the second set of PUCCH resource IDs for transmitting a second HARQ-ACK codebook correspond to different priorities. For example, the first HARQ-ACK codebook may be used for the eMBB service (which may have a low priority), whereas the second HARQ-ACK codebook may be used for the URLLC service (which may have a high priority).

In one implementation, the first PUCCH configuration further indicates a first set of PUCCH spatial relation information IDs. The second PUCCH configuration further indicates a second set of PUCCH spatial relation information IDs. Related disclosure may refer to implementations in Case 1-5. The maximum number of IDs in the first set PUCCH spatial relation information IDs (e.g., maxNrofSpatialRelationInfos) may be greater than the number specified in Rel-15.

Figure 6:
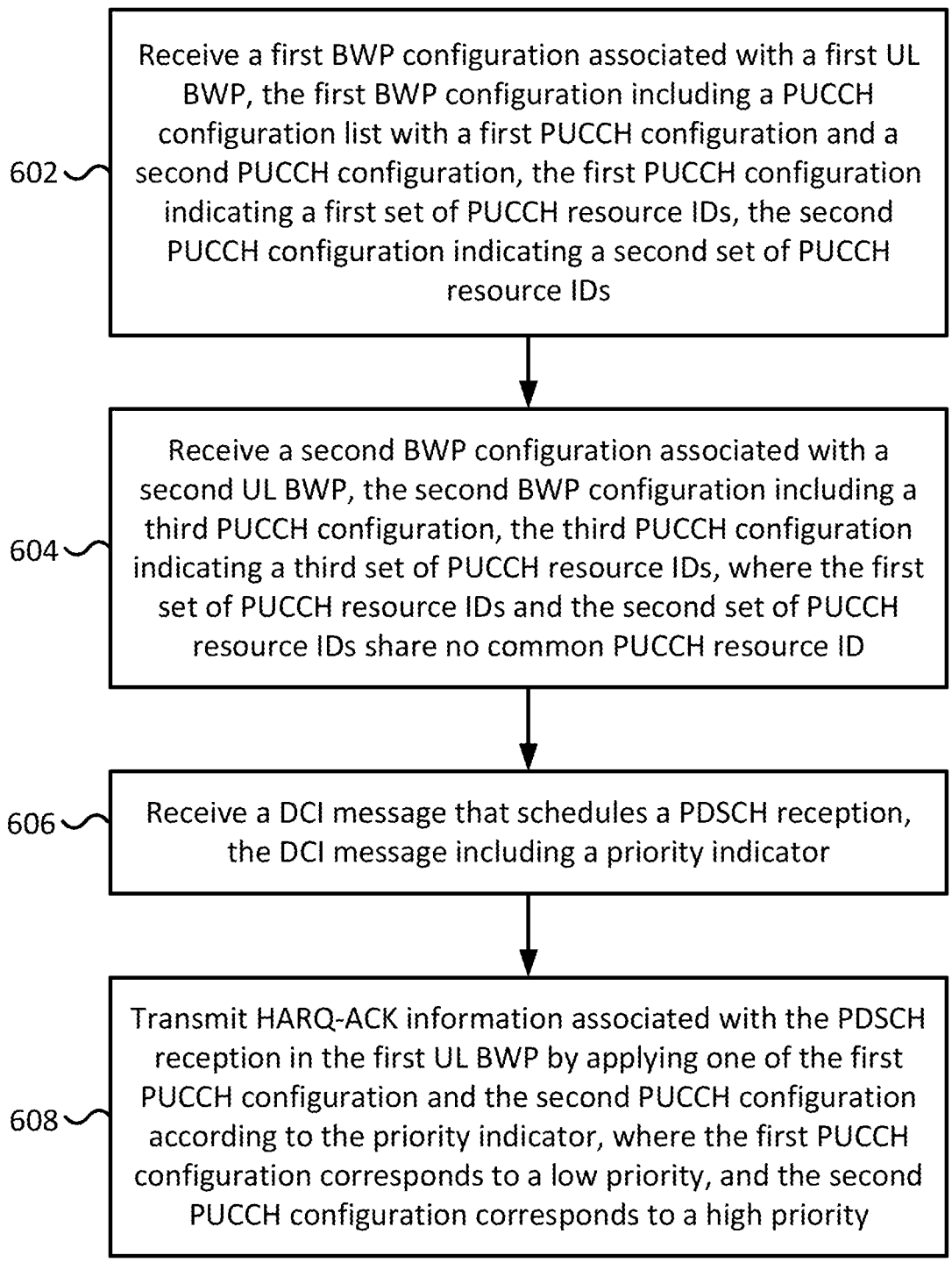
FIG. 6 illustrates a method for configuring PUCCH resources according to another example implementation of the present disclosure.

FIG. 6 illustrates a method 600 for configuring PUCCH resources according to an example implementation of the present disclosure. Action 602 and action 604 correspond to action 502 and action 504 illustrated in FIG. 5, respectively. In action 606, the UE receives a DCI message that schedules a PDSCH reception, the DCI message including a priority indicator. Related disclosure may refer to implementations in Case 1-8. The PDSCH reception scheduled by the DCI message may contain a PUCCH spatial relation activation/deactivation MAC CE.

In action 608, the UE transmits HARQ-ACK information associated with the PDSCH reception in the first UL BWP by applying one of the first PUCCH configuration and the second PUCCH configuration according to the priority indicator. The first PUCCH configuration corresponds to a low priority, and the second PUCCH configuration corresponds to a high priority. For example, the UE may apply the first PUCCH configuration to transmit the eMBB HARQ-ACK codebook upon determining that the priority indicator in the DCI message indicates a low priority; and the UE may apply the second PUCCH configuration to transmit the URLLC HARQ-ACK codebook upon determining that the priority indicator in the DCI message indicates a high priority.

In one implementation, in action 608, the UE may simultaneously generate first HARQ-ACK information corresponding to the first PUCCH configuration and second HARQ-ACK information corresponding to the second PUCCH configuration. The first HARQ-ACK information and the second HARQ-ACK information may correspond to different priorities. The UE may transmit one of the first HARQ-ACK information and the second HARQ-ACK information according to the priority indicator. The first HARQ-ACK information associated with the first PUCCH configuration may refer to a low priority transmission, and the second HARQ-ACK information associated with the second PUCCH configuration may refer to a high priority transmission. In one implementation, the HARQ-ACK information transmitted in action 608 is in response to the PDSCH reception scheduled by the DCI message received in action 606.

Referring to the PUCCH transmission 100 illustrated in FIG. 1, if the UE is instructed to generate two HARQ-ACK codebooks, PUCCH resource 102 in slot #0 for eMBB HARQ-ACK transmission (e.g., a PUCCH of low priority) and PUCCH resource 104 in slot #0 for URLLC HARQ-ACK transmission (e.g., a PUCCH of high priority). As disclosed in action 502 and action 504 illustrated in FIG. 5, because the first set of PUCCH resource IDs and the second set of PUCCH resource IDs share no common PUCCH resource ID, PUCCH spatial relation information for the first PUCCH configuration and PUCCH spatial relation information for the second PUCCH configuration can be configured separately.

A PUCCH spatial relation information ID used for the eMBB HARQ-ACK codebook (PUCCH resource 102) can be independent of a PUCCH spatial relation information ID used for the URLLC HARQ-ACK codebook (PUCCH resource 104). Therefore, the UE can apply different PUCCH spatial relation information for PUCCH resource 102 and PUCCH resource 104, even if PUCCH resource 102 and PUCCH resource 104 are scheduled in the same slot.

Referring to the PUCCH transmission 100 illustrated in FIG. 1, PUCCH resource 102 in slot #0 is for eMBB HARQ-ACK transmission (e.g., a PUCCH of low priority) and PUCCH resource 112 in slot #1 is for URLLC HARQ-ACK transmission (e.g., a PUCCH of high priority). As disclosed in action 502 and action 504 illustrated in FIG. 5, because the first set of PUCCH resource IDs and the second set of PUCCH resource IDs share no common PUCCH resource ID, PUCCH spatial relation information for the first PUCCH configuration and PUCCH spatial relation information for the second PUCCH configuration can be configured separately.

A PUCCH spatial relation information ID used for the eMBB HARQ-ACK codebook (PUCCH resource 102) can be independent of a PUCCH spatial relation information ID used for the URLLC HARQ-ACK codebook (PUCCH resource 112). Therefore, the UE can apply different PUCCH spatial relation information for PUCCH resource 102 and PUCCH resource 112, even if PUCCH resource 102 and PUCCH resource 112 are separated by only 1 slot.

All implementations in the present disclosure are not limited to address the problem identified in the present disclosure. For example, the disclosed implementations may be applied to solve any problem existing in an RAN of a cellular wireless communication system.

All the numbers in the implementations in the present disclosure are just exemplary rather than limiting. The numbers are provided as an example to better illustrate how the method is executed.

Figure 7:
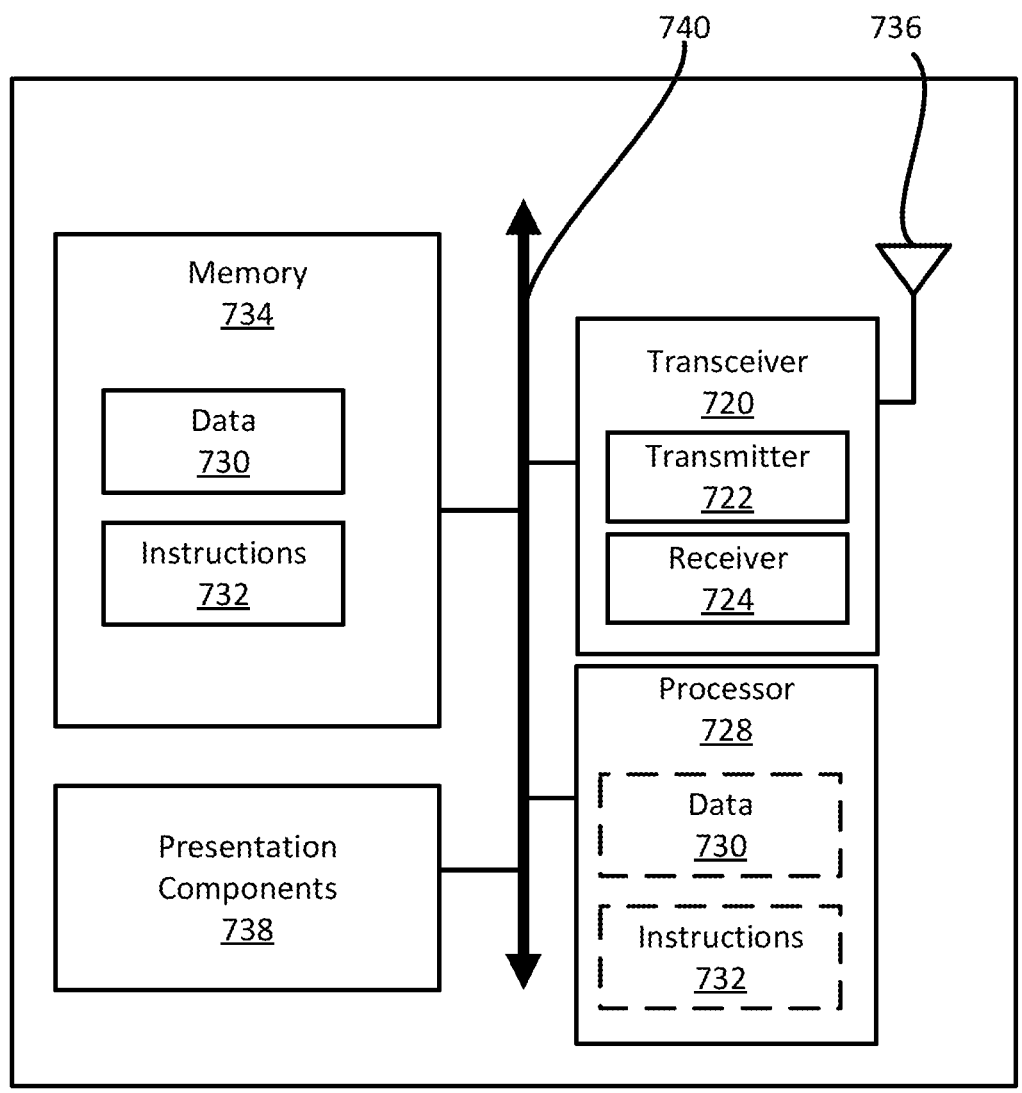
FIG. 7 is a block diagram illustrating a node for wireless communication according to an example implementation of the present disclosure.

FIG. 7 is a block diagram illustrating a node 700 for wireless communication according to an example implementation of the present disclosure. As illustrated in FIG. 7, the node 700 may include a transceiver 720, a processor 728, a memory 734, one or more presentation components 738, and at least one antenna 736. The node 700 may also include a radio frequency (RF) spectrum band module, a BS communications module, a network communications module, and a system communications management module, Input/Output (I/O) ports, I/O components, and a power supply (not illustrated in FIG. 7).

Each of the components may directly or indirectly communicate with each other over one or more buses 740. The node 700 may be a UE or a BS that performs various functions disclosed with reference to FIGS. 1 through 6.

The transceiver 720 has a transmitter 722 (e.g., transmitting/transmission circuitry) and a receiver 724 (e.g., receiving/reception circuitry) and may be configured to transmit and/or receive time and/or frequency resource partitioning information. The transceiver 720 may be configured to transmit in different types of subframes and slots including but not limited to usable, non-usable and flexibly usable subframes and slot formats. The transceiver 720 may be configured to receive data and control channels.

The node 700 may include a variety of computer-readable media. Computer-readable media may be any available media that may be accessed by the node 700 and include both volatile and non-volatile media, and removable and non-removable media.

The computer-readable media may include computer storage media and communication media. Computer storage media may include both volatile and non-volatile media, and removable and non-removable media implemented in any method or technology for storage of information such as computer-readable instructions, data structures, program modules or data.

Computer storage media may include RAM, ROM, EPROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media may not include a propagated data signal. Communication media may typically embody computer-readable instructions, data structures, program modules or other data in a modulated data signal such as a carrier wave or other transport mechanism and include any information delivery media.

The term "modulated data signal" means a signal that has one or more of its characteristics set or changed in such a manner as to encode information in the signal. Communication media may include wired media such as a wired network or direct-wired connection, and wireless media such as acoustic, RF, infrared and other wireless media. Combinations of any of the previously listed components should also be included within the scope of computer-readable media.

The memory 734 may include computer-storage media in the form of volatile and/or non-volatile memory. The memory 734 may be removable, non-removable, or a combination thereof. Example memory may include solid-state memory, hard drives, optical-disc drives, etc.

As illustrated in FIG. 7, the memory 734 may store computer-readable, computer-executable instructions 732 (e.g., software codes) that are configured to cause the processor 728 to perform various functions disclosed herein with reference to FIGS. 1 through 6. Alternatively, the instructions 732 may not be directly executable by the processor 728 but be configured to cause the node 700 (e.g., when compiled and executed) to perform various functions disclosed herein.

The processor 728 (e.g., having processing circuitry) may include an intelligent hardware device, e.g., a Central Processing Unit (CPU), a microcontroller, an ASIC, etc. The processor 728 may include memory. The processor 728 may process the data 730 and the instructions 732 received from the memory 734, and information transmitted and received via the transceiver 720, the base band communications module, and/or the network communications module. The processor 728 may also process information to be sent to the transceiver 720 for transmission via the antenna 736 to the network communications module for transmission to a core network.

One or more presentation components 738 may present data indications to a person or another device. Examples of presentation components 738 may include a display device, a speaker, a printing component, and a vibrating component, etc.

In view of the present disclosure, it is obvious that various techniques may be used for implementing the disclosed concepts without departing from the scope of those concepts. Moreover, while the concepts have been disclosed with specific reference to certain implementations, a person of ordinary skill in the art may recognize that changes may be made in form and detail without departing from the scope of those concepts. As such, the disclosed implementations are to be considered in all respects as illustrative and not restrictive. It should also be understood that the present disclosure is not limited to the particular implementations disclosed and many rearrangements, modifications, and substitutions are possible without departing from the scope of the present disclosure.

What is claimed is:

1. A user equipment (UE) for configuring Physical Uplink Control Channel (PUCCH) resources, the UE comprising:
   at least one processor; and
   at least one memory coupled to the at least one processor, wherein the at least one memory stores one or more computer-executable instructions that, when executed by the at least one processor, cause the UE to:
   receive a first bandwidth part (BWP) configuration associated with a first uplink (UL) BWP, the first BWP configuration including a PUCCH-ConfigList information element (IE), which includes a first PUCCH-Config IE and a second PUCCH-Config IE, the first PUCCH-Config IE indicating a first set of PUCCH resource identifiers (IDs), and the second PUCCH-Config IE indicating a second set of PUCCH resource IDs, wherein:
a first PUCCH resource, which corresponds to a first resource ID selected from the first set of PUCCH resource IDs for transmitting a first hybrid automatic repeat request acknowledgement (HARQ-ACK) codebook associated with the first PUCCH-Config IE, corresponds to a low priority,
a second PUCCH resource, which corresponds to a first resource ID selected from the second set of PUCCH resource IDs for transmitting a second HARQ-ACK codebook associated with the second PUCCH-Config IE, corresponds to a high priority, and
the first set of PUCCH resource IDs and the second set of PUCCH resource IDs share no common PUCCH resource ID.

2. The UE of claim 1, wherein the first PUCCH-Config IE and the second PUCCH-Config IE correspond to different service types.

3. The UE of claim 1, wherein:
the first PUCCH-Config IE further indicates a first set of PUCCH spatial relation information IDs, and
the second PUCCH-Config IE further indicates a second set of PUCCH spatial relation information IDs.

4. The UE of claim 1, wherein the one or more computer-executable instructions, when executed by the at least one processor, further cause the UE to:
receive a downlink control information (DCI) message that schedules a Physical Downlink Shared Channel (PDSCH) reception, the DCI message including a priority indicator; and
transmit HARQ-ACK information associated with the PDSCH reception in the first UL BWP after applying one of the first PUCCH-Config IE and the second PUCCH-Config IE according to the priority indicator.

5. A method performed by a user equipment (UE) for configuring Physical Uplink Control Channel (PUCCH) resources, the method comprising:
receiving a first bandwidth part (BWP) configuration associated with a first uplink (UL) BWP, the first BWP configuration including a PUCCH-ConfigList information element (IE), which includes a first PUCCH-Config IE and a second PUCCH-Config IE, the first PUCCH-Config IE indicating a first set of PUCCH resource identifiers (IDs), and the second PUCCH-Config IE indicating a second set of PUCCH resource IDs, wherein:
a first PUCCH, which corresponds to a first resource ID resource selected from the first set of PUCCH resource IDs for transmitting a first hybrid automatic repeat request acknowledgement (HARQ-ACK) codebook associated with the first PUCCH-Config IE, corresponds to a low priority,
a second PUCCH resource, which corresponds to a second resource ID selected from the second set of PUCCH resource IDs for transmitting a second HARQ-ACK codebook associated with the second PUCCH-Config IE, corresponds to a high priority, and
the first set of PUCCH resource IDs and the second set of PUCCH resource IDs share no common PUCCH resource ID.

6. The method of claim 5, wherein the first PUCCH-Config IE and the second PUCCH-Config IE correspond to different service types.

7. The method of claim 5, wherein:
the first PUCCH-Config IE further indicates a first set of PUCCH spatial relation information IDs, and
the second PUCCH-Config IE further indicates a second set of PUCCH spatial relation information IDs.

8. The method of claim 5, further comprising:
receiving a downlink control information (DCI) message that schedules a Physical Downlink Shared Channel (PDSCH) reception, the DCI message including a priority indicator; and
transmitting HARQ-ACK information associated with the PDSCH reception in the first UL BWP after applying one of the first PUCCH-Config IE and the second PUCCH-Config IE according to the priority indicator.

9. A method performed by a base station (BS) for configuring Physical Uplink Control Channel (PUCCH) resources, the method comprising:
transmitting a first bandwidth part (BWP) configuration associated with a first uplink (UL) BWP, the first BWP configuration including a PUCCH-ConfigList information element (IE), which includes a first PUCCH-Config IE and a second PUCCH-Config IE, the first PUCCH-Config IE indicating a first set of PUCCH resource identifiers (IDs), and the second PUCCH-Config IE indicating a second set of PUCCH resource IDs, wherein:
a first PUCCH resource, which corresponds to a first resource ID selected from the first set of PUCCH resource IDs for receiving a first hybrid automatic repeat request acknowledgement (HARQ-ACK) codebook associated with the first PUCCH-Config IE, corresponds to a low priority,
a second PUCCH resource, which corresponds to a second resource ID selected from the second set of PUCCH resource IDs for receiving a second HARQ-ACK codebook associated with the second PUCCH-Config IE, corresponds to a high priority, and
the first set of PUCCH resource IDs and the second set of PUCCH resource IDs share no common PUCCH resource ID.

10. The method of claim 9, wherein the first PUCCH-Config IE and the second PUCCH-Config IE correspond to different service types.

11. The method of claim 9, wherein:
the first PUCCH-Config IE further indicates a first set of PUCCH spatial relation information IDs, and
the second PUCCH-Config IE further indicates a second set of PUCCH spatial relation information IDs.

12. The method of claim 9, further comprising:
transmitting a downlink control information (DCI) message that schedules a Physical Downlink Shared Channel (PDSCH), the DCI message including a priority indicator; and
receiving HARQ-ACK information associated with the PDSCH in the first UL BWP,
wherein the priority indicator enables the UE to apply one of the first PUCCH-Config IE and the second PUCCH-Config IE for the HARQ-ACK information associated with the PDSCH.

* * * * *